United States Patent
Takahashi et al.

(10) Patent No.: US 11,977,627 B2
(45) Date of Patent: May 7, 2024

(54) EVALUATION DEVICE, EVALUATION METHOD, AND EVALUATION PROGRAM

(71) Applicant: NIPPON TELEGRAPH AND TELEPHONE CORPORATION, Tokyo (JP)

(72) Inventors: Tomokatsu Takahashi, Musashino (JP); Masanori Yamada, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 304 days.

(21) Appl. No.: 17/441,701

(22) PCT Filed: Mar. 11, 2020

(86) PCT No.: PCT/JP2020/010520
§ 371 (c)(1),
(2) Date: Sep. 22, 2021

(87) PCT Pub. No.: WO2020/195826
PCT Pub. Date: Oct. 1, 2020

(65) Prior Publication Data
US 2022/0147620 A1    May 12, 2022

(30) Foreign Application Priority Data
Mar. 26, 2019  (JP) .................. 2019-058884

(51) Int. Cl.
*G06F 21/00* (2013.01)
*G06F 21/55* (2013.01)
*G06N 20/00* (2019.01)

(52) U.S. Cl.
CPC .......... *G06F 21/552* (2013.01); *G06N 20/00* (2019.01); *G06F 2221/034* (2013.01)

(58) Field of Classification Search
None
See application file for complete search history.

(56) References Cited

U.S. PATENT DOCUMENTS 10,685,293 B1 * 6/2020 Heimann ............ H04L 63/1425

FOREIGN PATENT DOCUMENTS

DE  102017223751 A1 * 6/2019 .......... G06N 3/0454
WO  2019/244930 A1    12/2019

OTHER PUBLICATIONS

Pelleg et al., "X-means: Extending K-means With Efficient Estimation of the Number of Clusters", Proc.of the 17th International Conference on Machine Learning, 2000, pp. 727-734. (Year: 2000).*

(Continued)

*Primary Examiner* — Andrew J Steinle
(74) *Attorney, Agent, or Firm* — XSENSUS LLP (57) ABSTRACT

An evaluation device receives input of latent variables of a variational autoencoder, clusters the input latent variables, and assigns, for each cluster, a label indicating the cluster to latent variables belonging to the cluster. After that, the evaluation device performs learning of a classifier so as to accurately classify the latent variables based on the assigned label, performs an adversarial attack resistance evaluation for the classifier after learning, and outputs a result of the resistance evaluation. Thus, the evaluation device can perform an adversarial attack resistance evaluation even for a variational autoencoder that uses unlabeled data as input data.

10 Claims, 7 Drawing Sheets

(56) References Cited

OTHER PUBLICATIONS

Losalka, "Resisting Adversarial Attacks Using Gaussian Mixture Variational Autoencoders", Towards Data Science, Feb. 18, 2019, pp. 1-9. (Year: 2019).*

International Search Report and Written Opinion dated Jun. 2, 2020, received for PCT Application PCT/JP2020/010520, Filed on Mar. 11, 2020, 9 pages including English Translation.

Kingma et al., "Auto-Encoding Variational Bayes", arXiv:1312.6114v10, May 1, 2014, pp. 1-14.

Goodfellow et al., "Explaining and Harnessing Adversarial Examples",Published as a conference paper at ICLR 2015, arXiv:1412.6572v3, Mar. 20, 2015, pp. 1-11.

Kos et al., "Adversarial Examples for Generative Models", arXiv:1702.06832v1, Feb. 22, 2017, pp. 1-25.

Losalka, "Resisting Adversarial Attacks Using Gaussian Mixture Variational Autoencoders", Towards Data Science, Available Online At: https://towardsdatascience.com/resisting-adversarial-attacks-using-gaussian-mixture-variational-autoencoders-be98e69b5070, Feb. 18, 2019, pp. 1-9.

Sato "Movie Light and Simple "K-means" that is Equivalent to making an LED Flicker", Features of light and simple K-means, Interface, 2018, vol. 44, No. 5, pp. 75-80.

Murata et al., "Person Identification by Interactive Machine Learning Based on Random Forest and Convolutional Feature—Application to Person Re-identification by Mobile Robots Circulating Around the Classroom", The 31st Annual Conference of the Japanese Society for Artificial Intelligence, 2017, pp. 1-3 (4 pages including English Abstract).

Pelleg et al., "X-means: Extending K-means With Efficient Estimation of the Number of Clusters", Proc. of the 17th International Conference on Machine Learning, 2000, pp. 727-734.

Partha Ghosh, et al., "Resisting Adversarial Attacks Using Gaussian Mixture Variational Autoencoders", Proceedings of the AAAI Conference on Artificial Intelligence, vol. 33, arXiv:1806.00081v2 [cs.LG], Dec. 10, 2018, 8 pages, XP055972911.

Matthew Willetts, et al., "Improving VAEs' Robustness to Adversarial Attack", arXiv:1906.00230v3 [stat.ML], Feb. 10, 2020, 10 pages, XP055972881.

* cited by examiner

| ε | DEFENSE SUCCESS RATE |
|---|---|
| 0 | 1.0 |
| 0.1 | 0.99 |
| 0.2 | 0.96 |
| 0.3 | 0.91 |
| 0.4 | 0.84 |
| 0.5 | 0.75 |
| 0.6 | 0.64 |
| 0.7 | 0.51 |
| 0.8 | 0.36 |
| 0.9 | 0.19 |
| 1.0 | 0 |

EVALUATION DEVICE, EVALUATION METHOD, AND EVALUATION PROGRAM

CROSS-REFERENCE TO RELATED APPLICATIONS

The present application is based on PCT filing PCT/JP2020/010520, filed Mar. 11, 2020, which claims priority to JP 2019-058884, filed Mar. 26, 2019, the entire contents of each are incorporated herein by reference.

TECHNICAL FIELD

The present invention relates to an evaluation device, an evaluation method, and an evaluation program.

BACKGROUND ART

A variational autoencoder (VAE) is widely used as a deep learning technique; while, in recent years, the threat of an adversarial attack that is an attack against the vulnerability of machine learning has been indicated. The adversarial attack is an attack technique in which the vulnerability of machine learning is intentionally exploited so as to cause a deterioration of the learning quality, misclassification in a classification problem, and the like. In recent years, for a supervised classification problem by deep learning, a technique that causes misdetection of data by using an adversarial example which is made by superposing a very small noise undetectable to humans on data has been a threat and has been studied.

The adversarial attack using the adversarial example is a serious threat also to the VAE that is unsupervised learning. The VAE compresses input data to a latent variable and reconstructs the input data from the latent variable; when a noise is added to the input data for the VAE by adversarial attacks, a reconfiguration destination is manipulated. As a result, for example, an abnormality detection system using the VAE may determine actually abnormal communication data as normal communication data. Therefore, it is an important problem to evaluate how resistant an existing VAE application is to adversarial attacks.

However, conventionally, an adversarial attack resistance evaluation for the VAE has been performed only when input data for the VAE has been labeled. This resistance evaluation for the VAE is performed by, for example, making a classifier learn to classify intermediate outputs for the VAE (latent variables) based on labels of input data for the VAE and performing an adversarial attack on the learned classifier.

CITATION LIST

Non-Patent Literature

Non-Patent Literature 1: Variational Auto Encoder (VAE), retrieved on Mar. 7, 2019, Internet <URL: https://:arxiv.org/abs/1312.6114>

Non-Patent Literature 2: Attack on supervised learning, retrieved on Mar. 7, 2019, Internet <URL:https://arxiv.org/abs/1412.6572>

Non-Patent Literature 3: Attack on unsupervised learning, retrieved on Mar. 7, 2019, Internet <URL:https://arxiv.org/abs/1702.06832>

SUMMARY OF THE INVENTION

Technical Problem

However, when the adversarial attack resistance evaluation for the VAE is performed by the above method, it is based on the premise that the input data for the VAE has been labeled. For this reason, it has been impossible to perform the adversarial attack resistance evaluation for the VAE that uses unlabeled data as input data. Therefore, an object of the present invention is to solve the above problem by allowing an adversarial attack resistance evaluation to be performed even for a VAE that uses unlabeled data as input data.

Means for Solving the Problem

In order to solve the above problem, the present invention includes: an input unit that receives input of latent variables of a variational autoencoder; a labeling unit that clusters the input latent variables by a predetermined clustering technique and assigns, for each cluster, a label of the cluster to latent variables belonging to the cluster; a learning unit that performs learning of a classifier by using the labeled latent variables as supervised data; an evaluation unit that performs an adversarial attack resistance evaluation for the classifier after learning; and an output unit that outputs a result of the adversarial attack resistance evaluation.

Effects of the Invention

According to the present invention, the adversarial attack resistance evaluation can be performed even for the VAE that uses unlabeled data as input data.

DESCRIPTION OF EMBODIMENTS

Hereinafter, a mode for carrying out the present invention (embodiment) will be described with reference to drawings. The present invention is not limited to the embodiment described below.

Figure 1:
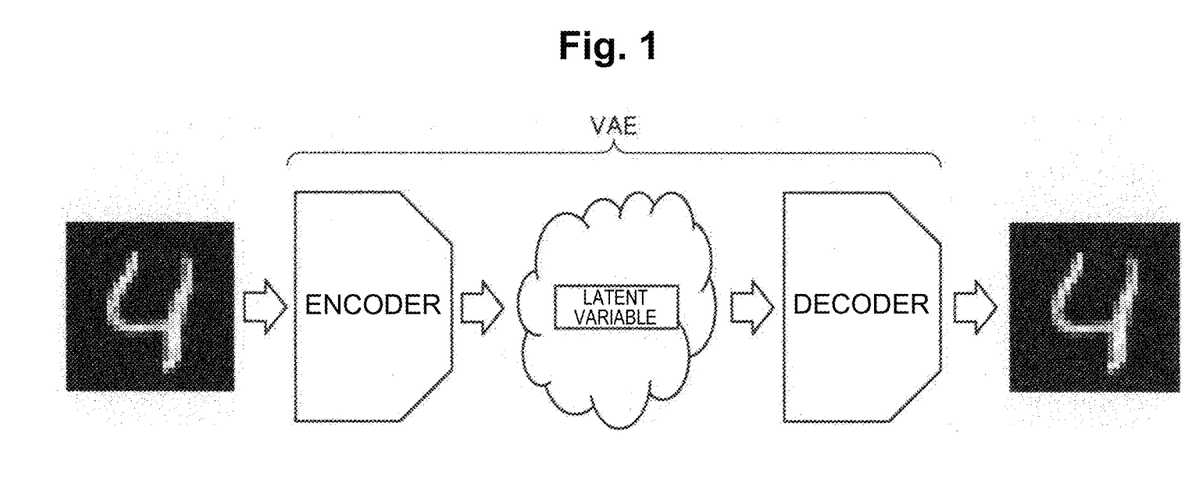
FIG. 1 is a diagram for describing an overview of a VAE.

First, an overview of a VAE will be described by using FIG. 1. The VAE learns, as shown in FIG. 1, to translate input data into a lower dimensional latent variable by a neural network called an encoder and then, reconstruct the input data by a decoder. As a result of the above learning, information required for reconstructing the input data is stored in the latent variable of the VAE. In other words, the latent variable represents the essential characteristic of the input data.

Figure 2:
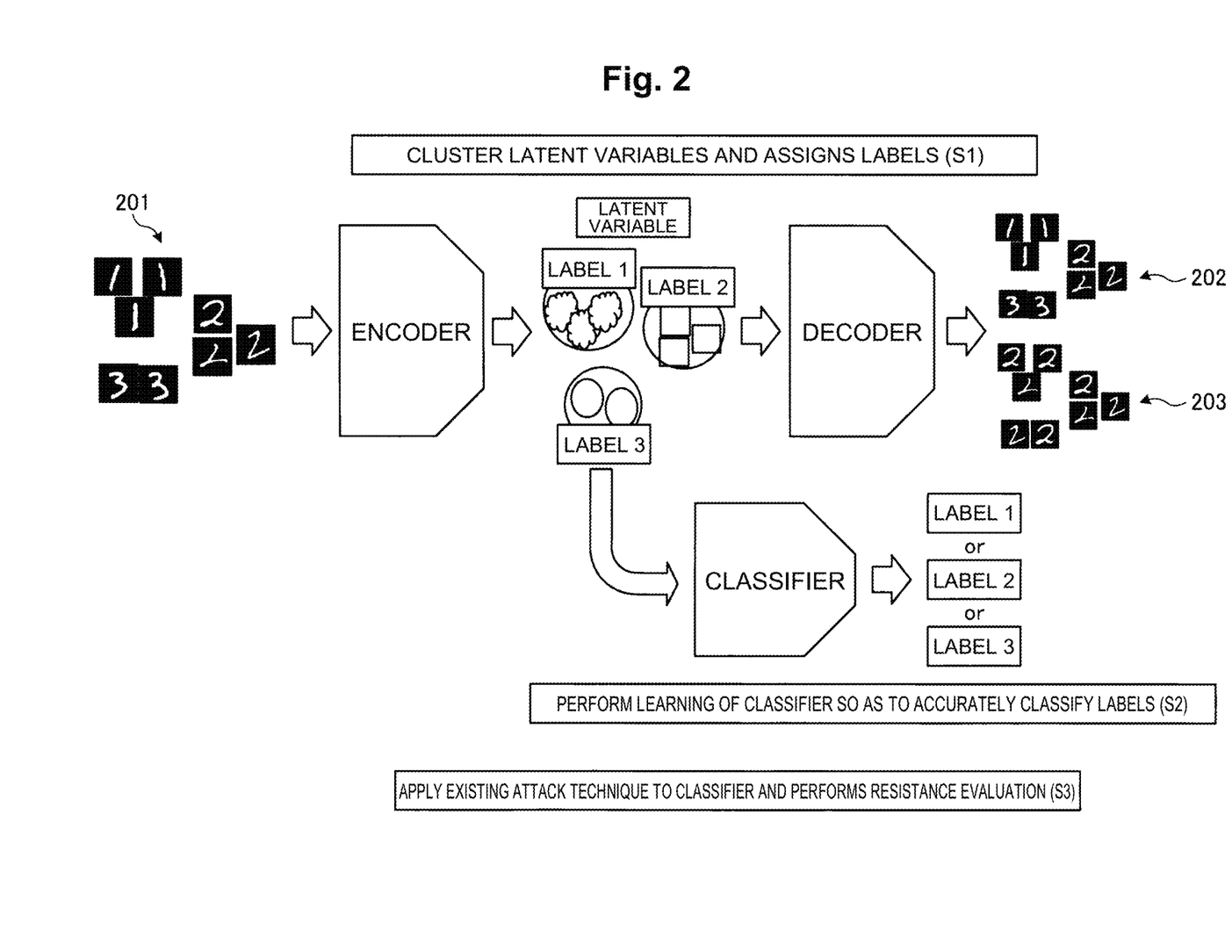
FIG. 2 is a diagram for describing an overview of the operation of an evaluation device.

Thus, the VAE after learning reconstructs, for example, when receiving input of a data set indicated by a reference sign 201 in FIG. 2, the data sets and outputs a data set indicated by a reference sign 202. However, when a noise is added to the VAE by an adversarial attack, the VAE may not reconstruct the data set of the reference sign 201 (see a reference sign 203).

Subsequently, an overview of the operation of an evaluation device that performs an adversarial attack resistance evaluation for the VAE will be described.

First, the evaluation device clusters latent variables learned by the VAE and assigns labels (S1). In other words, since essentially similar input data has the same latent variable, the evaluation device generates a cluster of latent variables having closer characteristics out of those learned by the VAE. Then, the evaluation device assigns, for each generated cluster, a label to latent variables belonging to the cluster (for example, label 1, label 2, label 3, and the like).

After S1, the evaluation device performs learning of a classifier so as to accurately classify the labels assigned to the latent variables in S1 (S2). Then, the evaluation device applies an existing attack technique to the classifier that has learned in S2, performing resistance evaluation (S3).

For example, the evaluation device applies an adversarial attack to the classifier that has learned in S2, performing resistance evaluation. Then, the evaluation device outputs a result of the resistance evaluation for the classifier, as an adversarial attack resistance evaluation for the VAE. In other words, the classifier having learned in S2 classifies data based on the characteristics (latent variables) learned by the VAE and therefore, applying, to the classifier, an attack that prevents the classifier from accurately classifying data can be considered as indirectly attacking the VAE itself. Therefore, the result of the adversarial attack resistance evaluation for the classifier that has learned in S2 can be considered as a result of the adversarial attack resistance evaluation for the VAE.

Figure 3:
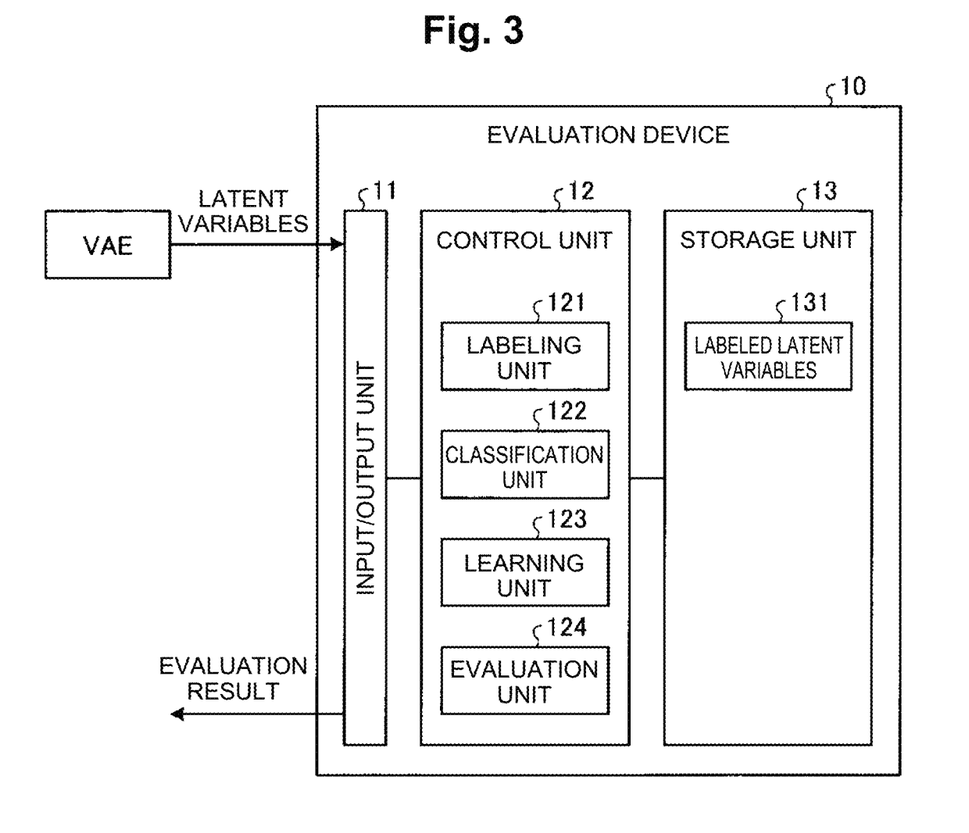
FIG. 3 is a diagram for describing a configuration example of the evaluation device.

Next, a configuration example of an evaluation device 10 will be described by using FIG. 3. The evaluation device 10 includes, for example, an input/output unit (input unit and output unit) 11, a control unit 12, and a storage unit 13, as shown in FIG. 3. The input/output unit 11 controls input/output of various kinds of data. For example, the input/output unit 11 receives input of latent variables of a VAE to be evaluated and outputs a result of an adversarial attack resistance evaluation for the VAE.

The control unit 12 performs overall control of the evaluation device 10. The storage unit 13 stores various kinds of information, which is referred to when the control unit 12 executes processing, and processing results of the control unit 12.

The control unit 12 includes, for example, a labeling unit 121, a classification unit 122, a learning unit 123, and an evaluation unit 124.

The labeling unit 121 clusters the latent variables of the VAE by a predetermined clustering technique and assigns, for each cluster, a label indicating the cluster (pseudo label) to latent variables belonging to the cluster.

For example, the labeling unit 121 clusters, when receiving input of latent variables of the VAE via the input/output unit 11, the latent variables by X-means or the like. Then, the labeling unit 121 assigns, for each cluster, the number of the cluster as a label (pseudo label) to latent variables belonging to the cluster. After that, the labeling unit 121 stores the labeled latent variables (labeled latent variables 131) in the storage unit 13.

The classification unit 122, which includes a predetermined classifier, classifies data by the classifier. The learning of the classifier is performed by the learning unit 123. Although the classifier (classification unit 122) is described as being installed inside the evaluation device 10, it may be installed outside the evaluation device 10.

The learning unit 123 performs learning of the classifier by using the labeled latent variables as supervised data. For example, the learning unit 123 performs learning of the classifier by using the labeled latent variables 131 stored in the storage unit 13 so as to accurately classify the latent variables according to labels.

The evaluation unit 124 performs an adversarial attack resistance evaluation for the classifier after learning by the learning unit 123. A result of the resistance evaluation is output to an external device via the input/output unit 11, for example. As an evaluation index in the adversarial attack resistance evaluation here, a defense success rate against adversarial attacks is used for example. For the defense success rate, a probability that the classifier classifies noise-added data into the same label as that of original data is used, for example. For example, the evaluation unit 124 measures, when the intensity of noise for generating an adversarial example is changed, the defense success rate of the classifier after learning, thereby performing an adversarial attack resistance evaluation for the classifier after learning.

In general, the relationship between an adversarial example, original data (original), and noise added to the data (noise) is expressed by the following equation (1).

$$\text{Adversarial Example} = (1-\varepsilon)^*\text{original} + \varepsilon^*\text{noise} \qquad \text{Equation (1)}$$

The ε in the above equation (1) is a parameter representing noise intensity. The evaluation unit 124 measures the defense success rate while variously changing ε, thereby allowing an adversarial attack resistance evaluation for the classifier after learning to be performed.

Figure 4:
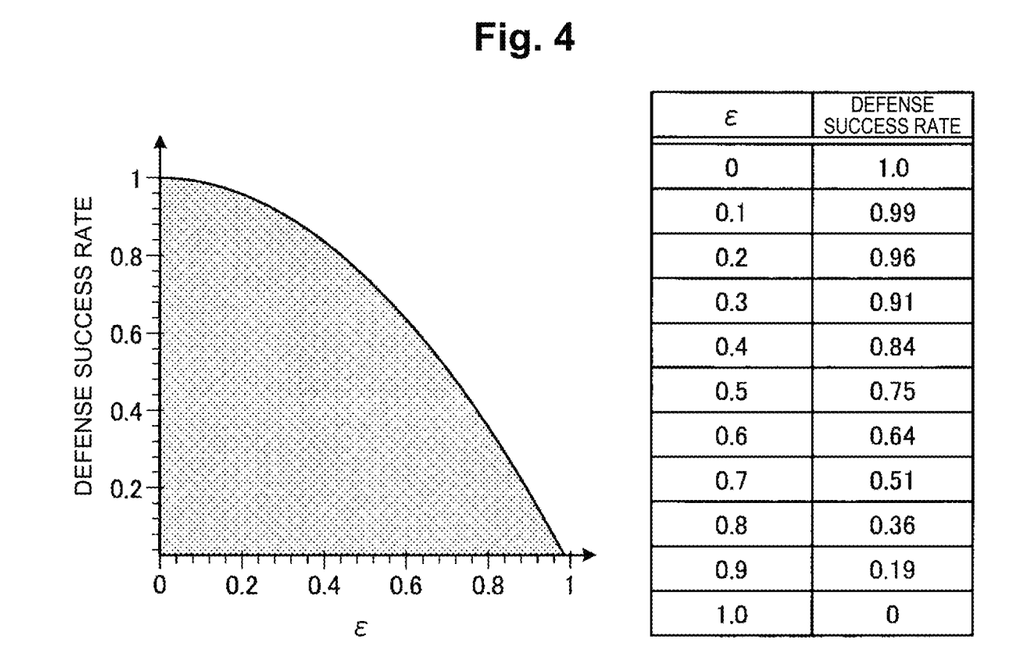
FIG. 4 is a diagram for describing an example of an adversarial attack resistance evaluation using defense success rates.

An example of the adversarial attack resistance evaluation for the VAE is shown in FIG. 4. In FIG. 4, a defense success rate when ε is incremented from 0 to by 0.1 is shown. When the area of a hatching portion in a graph shown on the left in FIG. 4 is larger, the VAE can be evaluated as being highly resistant (or robust) to attacks.

Figure 5:
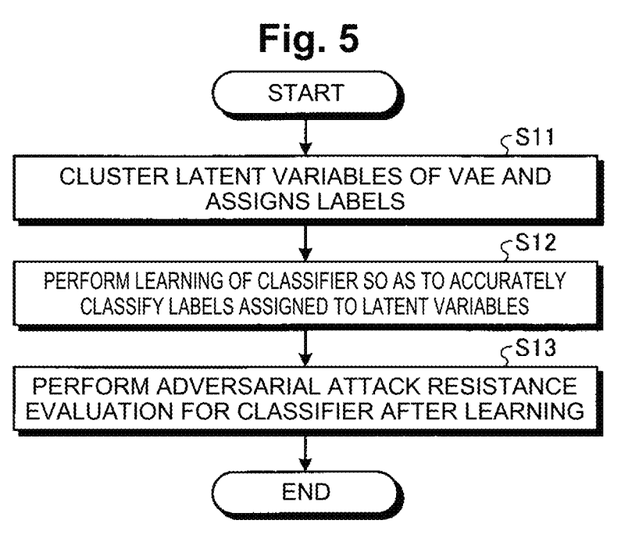
FIG. 5 is a diagram showing an example of a processing procedure of the evaluation device.

Next, an example of a processing procedure of the evaluation device 10 will be described using FIG. 5. First, the labeling unit 121 of the evaluation device 10 clusters, when receiving input of latent variables of the VAE to be evaluated via the input/output unit 11, the input VAE latent variables and assigns labels (S11). Next, the learning unit 123 performs learning of the classifier so as to accurately classify the labels assigned to the latent variables in S1 (S12). Then, the evaluation unit 124 performs an adversarial attack resistance evaluation for the classifier after learning (S13). After that, the evaluation unit 124 outputs a result of the resistance evaluation via the input/output unit 11.

In this way, the evaluation device 10 can perform an adversarial attack resistance evaluation even for a VAE that uses unlabeled data as input data.

In the above embodiment, it has been described that the VAE which the evaluation device 10 targets for the resistance evaluation is outside the evaluation device 10; however, it may be included inside the evaluation device 10.

In addition, the above adversarial attack resistance evaluation for the VAE may be applied to a resistance evaluation for a communication abnormality detection system using a VAE. First, an overview of a communication abnormality detection system using a VAE will be described.

Figure 6:
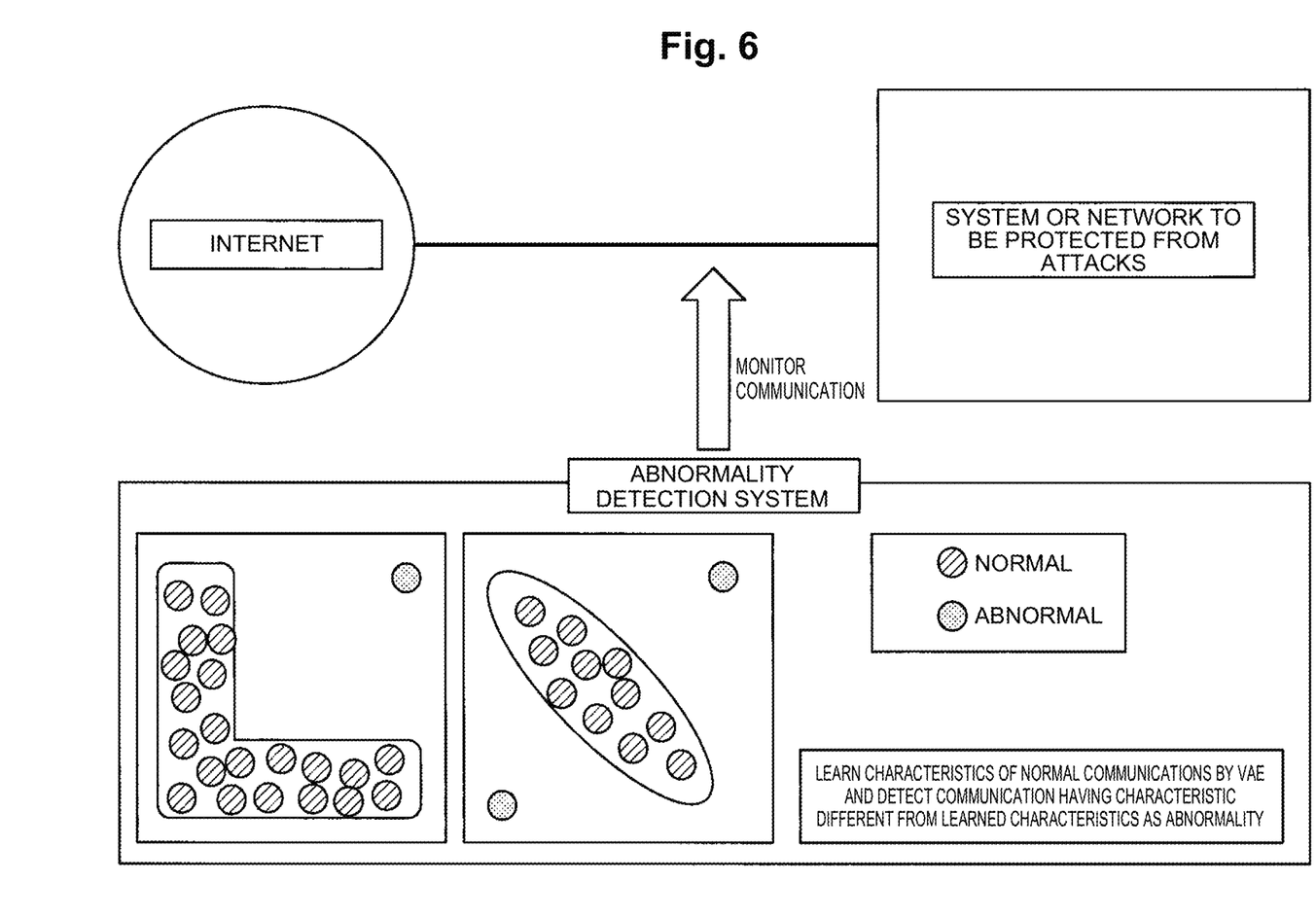
FIG. 6 is a diagram for describing an example of a communication abnormality detection system using the VAE.

For example, as shown in FIG. 6, the abnormal detection system learns the characteristics of a normal communication (a normal communication between the internet and a system desired to be protected from attacks) by the VAE. After that, the abnormal detection system monitors a communication between the internet and the system desired to be protected from attacks; and detects a communication having a characteristic different from the learned characteristics, as being abnormal. Communication characteristics here are, for example, the destination address, transmission source address, protocol, port number, http parameter, packet length, number of packets of the communication.

In this case, the evaluation device 10 assigns labels to latent variables of the VAE after the learning described above and performs learning of the classifier so as to perform a resistance evaluation for the abnormality detection system. For example, first, the VAE of the abnormality detection system compresses various communication data including both normal communications and abnormal communications into latent variables. Then, the evaluation device 10 clusters the above latent variables by using a clustering technique such as X-means; and assigns, for each cluster, a label of the cluster to latent variables belonging to the cluster. After that, the evaluation device 10 performs learning of the classifier so as to accurately classify data based on the assigned label.

Next, the evaluation device 10 applies an adversarial attack to the classifier after learning. For example, the evaluation device 10 prepares abnormal communication data which should be detected by the abnormality detection system and normal communication data used for spoofing in abnormality communication data; and assigns a label for each piece of the communication data. Then, the evaluation device 10 superposes noise that causes the classifier after learning to erroneously classify abnormal communication data into the same label as that of normal communication data, thereby indirectly applying an adversarial attack to the VAE of the abnormality detection system. For example, the evaluation device 10 superposes, to communication data that is input to the abnormality detection system, noise that causes only a portion unrelated to malware functions in the communication data to be altered.

Then, the evaluation device 10 superposes noise of various intensities to the communication data based on the above-described index for the adversarial attack resistance evaluation, thereby evaluating whether the abnormality detection system can detect an abnormality. Thus, the evaluation device 10 can evaluate the resistance of the abnormality detection system against adversarial attacks.

The functions of the evaluation device 10 described in the above embodiment can be implemented by installing a program that realizes the functions in a desired information processing device (computer). For example, by making an information processing device execute the above program which is provided as packaged software or online software, the information processing device can be made to function as the evaluation device 10. The information processing device mentioned here includes a desk top or notebook personal computer, a rack mounted server computer, and the like. In addition to them, the information processing device includes, in its category, a mobile communication terminal such as a smartphone, a cellular phone, and a personal handy-phone system (PHS), and further, a personal digital assistants (PDA) and the like. Furthermore, the evaluation device 10 may be implemented in a cloud server.

Figure 7:
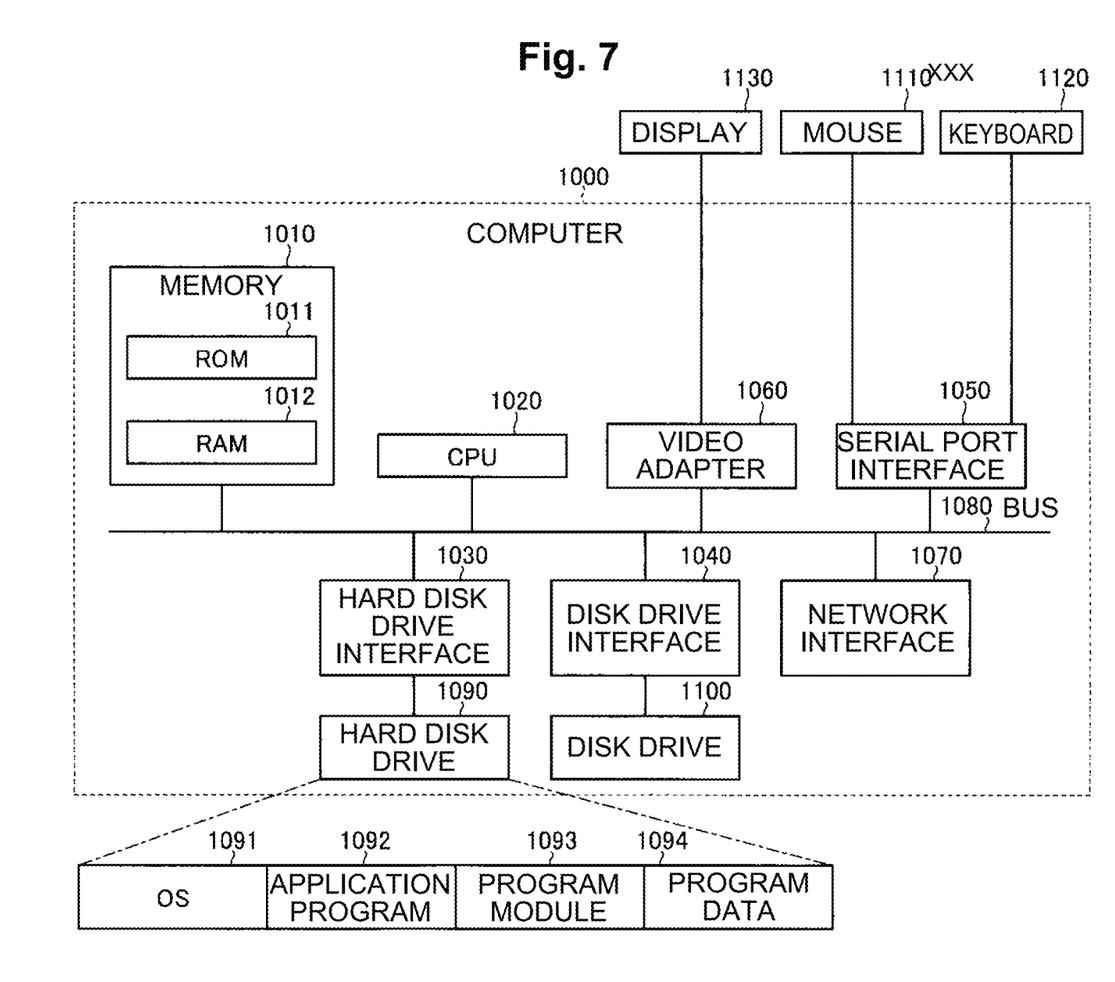
FIG. 7 is a diagram showing an example of a computer that executes an evaluation program.

An example of a computer that executes the above program (evaluation program) will be described using FIG. 7. As shown in FIG. 7, a computer 1000 includes, for example: a memory 1010, a CPU 1020, a hard disk drive interface 1030, a disk drive interface 1040, a serial port interface 1050, a video adapter 1060, and a network interface 1070. These components are connected by a bus 1080.

The memory 1010 includes a read only memory (ROM) 1011 and a random access memory (RAM) 1012. The ROM 1011 stores, for example, a boot program such as a basic input output system (BIOS). The hard disk drive interface 1030 is connected to a hard disk drive 1090. The disk drive interface 1040 is connected to a disk drive 1100. In the disk drive 1100, an attachable/detachable storage medium such as a magnetic disk or an optical disk, for example, is inserted. To the serial port interface 1050, a mouse 1110 and a keyboard 1120, for example, are connected. To the video adapter 1060, a display 1130, for example, is connected.

Here, as shown in FIG. 7, the hard disk drive 1090 stores, for example, an OS 1091, an application program 1092, a program module 1093, and program data 1094. Various kinds of data and information described in the above embodiment is stored in, for example, the hard disk drive 1090 and the memory 1010.

The CPU 1020 reads the program module 1093 and program data 1094, which are stored in the hard disk drive 1090, to the RAM 1012 as required; and executes each procedure described above.

It should be noted that the program module 1093 and the program data 1094 which are related to the above evaluation program are not limited to a case where they are stored in the hard disk drive 1090 and for example, they may be stored in an attachable/detachable storage medium and may be read out by the CPU 1020 via the disk drive 1100 or the like. Furthermore, the program module 1093 and the program data 1094 which are related to the above program may be stored in another computer that is connected via a network such as a LAN or a wide area network (WAN) and may be read out by the CPU 1020 via the network interface 1070.

REFERENCE SIGNS LIST

10 Evaluation device
11 Input/output unit
12 Control unit
13 Storage unit
121 Labeling unit
122 Classification unit
123 Learning unit
124 Evaluation unit

The invention claimed is:

1. An evaluation device, comprising:
a memory; and
a processor coupled to the memory and configured to:
receive input of latent variables of a variational autoencoder;
cluster the input latent variables by a predetermined clustering method and assign, for each cluster, a label of the cluster to latent variables belonging to the cluster;
perform learning of a classifier by using the labeled latent variables and corresponding labels as supervised data;
perform an adversarial attack resistance evaluation for the classifier after learning; and
output a result of the adversarial attack resistance evaluation, wherein the processor is further configured to:
measure a probability that the classifier classifies data after noise addition into a same label as a label assigned to data before the noise addition, the processor measuring the probability for each intensity of noise, the noise being added to data that is input to the classifier after learning, thereby performing an adversarial attack resistance evaluation for the classifier after learning, and wherein the processor is further configured to add the noise into the same label according to the formula:

$$(1-\varepsilon)*label+\varepsilon*noise$$

where $\varepsilon$ is a parameter representing noise intensity.

2. The evaluation device according to claim 1, wherein: the predetermined clustering method is X-means.

3. The evaluation device according to claim 1, wherein the result of the adversarial attack resistance evaluation includes a success rate of classification.

4. The evaluation device according to claim 1, wherein the processor is configured to repeatedly perform the adversarial attack resistance evaluation for the classifier using different values of $\varepsilon$.

5. The evaluation device according to claim 4, wherein the different values of $\varepsilon$ are in a range of $0 \leq \varepsilon < 0.1$.

6. The evaluation device according to claim 5, wherein the noise is added to a portion of the label unrelated to malware functions.

7. The evaluation device according to claim 1, wherein the latent variable corresponding to communication characteristics of communications to be monitored by the classifier.

8. The evaluation device according to claim 7, wherein the communication characteristics include at least one of destination address, transmission source address, protocol, port number, http parameter, packet length, or number of packets.

9. An evaluation method that is executed by an evaluation device, comprising:
receiving input of latent variables of a variational auto-encoder;
clustering the input latent variables by a predetermined clustering method and assigning, for each cluster, a label of the cluster to latent variables belonging to the cluster;
performing learning of a classifier by using the labeled latent variables and corresponding labels as supervised data;
performing an adversarial attack resistance evaluation for the classifier after learning; and
outputting a result of the adversarial attack resistance evaluation,
wherein the method further includes:
measuring a probability that the classifier classifies data after noise addition into a same label as a label assigned to data before the noise addition, measuring the probability for each intensity of noise, the noise being added to data that is input to the classifier after learning, thereby performing an adversarial attack resistance evaluation for the classifier after learning, and
wherein the method further includes adding the noise into the same label according to the formula:

$$(1-\varepsilon)*label+\varepsilon*noise$$

where $\varepsilon$ is a parameter representing noise intensity.

10. A non-transitory computer readable storage medium having stored therein an evaluation program that causes a computer to execute a process comprising:
receiving input of latent variables of a variational auto-encoder;
clustering the input latent variables by a predetermined clustering method and assigning, for each cluster, a label of the cluster to latent variables belonging to the cluster;
performing learning of a classifier by using the labeled latent variables and corresponding labels as supervised data;
performing an adversarial attack resistance evaluation for the classifier after learning; and
outputting a result of the adversarial attack resistance evaluation,
wherein the process further includes:
measuring a probability that the classifier classifies data after noise addition into a same label as a label assigned to data before the noise addition, measuring the probability for each intensity of noise, the noise being added to data that is input to the classifier after learning, thereby performing an adversarial attack resistance evaluation for the classifier after learning, and
wherein the method further includes adding the noise into the same label according to the formula:

$$(1-\varepsilon)*label+\varepsilon*noise$$

where $\varepsilon$ is a parameter representing noise intensity.

* * * * *